US012568939B1

(12) United States Patent
     Li

(10) Patent No.:     US 12,568,939 B1
(45) Date of Patent:     Mar. 10, 2026

(54) BIRD FEEDER

(71) Applicant: Meifeng Li, Yingde City (CN)

(72) Inventor: Meifeng Li, Yingde City (CN)

( * ) Notice: Subject to any disclaimer, the term of this patent is extended or adjusted under 35 U.S.C. 154(b) by 0 days.

(21) Appl. No.: 19/221,515

(22) Filed: May 29, 2025

(30)         Foreign Application Priority Data

May 14, 2025     (CN) .......................... 202520950082.X

(51) Int. Cl.
     *A01K 39/012*         (2006.01)
(52) U.S. Cl.
     CPC .................................. *A01K 39/012* (2013.01)
(58) Field of Classification Search
     CPC .... A01K 39/01; A01K 39/02; A01K 39/0206;
                         A01K 39/012; A01K 2227/30
     See application file for complete search history.

(56)         References Cited

U.S. PATENT DOCUMENTS

| | | | | |
|---|---|---|---|---|
| 9,247,719 | B1 * | 2/2016 | Bennett .................. | A01K 39/04 |
| 9,713,318 | B1 * | 7/2017 | Albawi .................. | G08C 17/02 |
| 10,149,915 | B1 * | 12/2018 | Klein ..................... | A61L 2/26 |
| 10,499,618 | B2 * | 12/2019 | Klein ..................... | H04N 7/188 |
| 10,796,141 | B1 * | 10/2020 | Shepherd, Jr ........ | G06V 10/751 |
| 11,985,957 | B1 * | 5/2024 | Li ....................... | A01K 39/0113 |
| D1,047,302 | S * | 10/2024 | Xue ............................. | D30/126 |
| D1,059,693 | S * | 1/2025 | Zheng .......................... | D30/126 |
| D1,065,709 | S * | 3/2025 | Li ................................. | D30/124 |
| D1,065,710 | S * | 3/2025 | Yan ............................. | D30/124 |

| | | | | |
|---|---|---|---|---|
| D1,073,201 | S * | 4/2025 | Ding ........................... | D30/126 |
| D1,081,016 | S * | 6/2025 | Ding ........................... | D30/126 |
| 2010/0024738 | A1 * | 2/2010 | Chen ..................... | A01K 39/02 |
| | | | | 119/72 |
| 2014/0182518 | A1 * | 7/2014 | Boehm ................ | A01K 31/007 |
| | | | | 119/429 |
| 2015/0122186 | A1 * | 5/2015 | Donegan ................ | A01K 39/04 |
| | | | | 119/51.5 |
| 2016/0113247 | A1 * | 4/2016 | McCord ............... | A01K 5/0142 |
| | | | | 119/52.3 |
| 2016/0156989 | A1 * | 6/2016 | Lovett .................... | H04N 7/183 |
| | | | | 348/143 |
| 2016/0366319 | A1 * | 12/2016 | Perkins .............. | H04N 1/00209 |
| 2017/0195551 | A1 * | 7/2017 | Klein ..................... | H04N 7/188 |
| 2018/0235186 | A1 * | 8/2018 | Masters ................. | A01K 31/12 |
| 2023/0027590 | A1 * | 1/2023 | Hu ........................ | G06V 40/103 |
| 2023/0032312 | A1 * | 2/2023 | Smith .................. | A01K 5/0275 |

(Continued)

FOREIGN PATENT DOCUMENTS

| | | | | | |
|---|---|---|---|---|---|
| CN | | 113115727 | A * | 7/2021 | ............. H04N 23/61 |
| CN | | 214903083 | U * | 11/2021 | ........... A01K 39/014 |
| CN | | 219125100 | U * | 6/2023 | |

(Continued)

*Primary Examiner* — Monica L Perry
*Assistant Examiner* — Aaron M Rodziwicz

(57)         ABSTRACT

A bird feeder includes a main body, a camera, a rechargeable battery, and a solar power supply device. The main body is provided with a feed bin and a feed dispensing opening. The feed bin is in communication with the feed dispensing opening. The camera is connected to the main body. The battery is electrically connected to the camera. The solar power supply device is electrically connected to the battery. The solar power supply device includes a solar panel. The solar panel is connected to the main body. The solar panel covers at least one part of a surface of the main body.

20 Claims, 10 Drawing Sheets

(56)               References Cited

U.S. PATENT DOCUMENTS

2023/0148570 A1*   5/2023   Pekcan  ................ A01K 29/005
                                                 119/429
2023/0270078 A1*   8/2023   Buzzard  .............. A01K 29/005

FOREIGN PATENT DOCUMENTS

CN           219514950 U  *   8/2023
CN           220587226 U  *   3/2024
CN           221829781 U  * 10/2024
CN           221887451 U  * 10/2024
CN           120323355 A  *   7/2025

* cited by examiner

BIRD FEEDER

CROSS-REFERENCE TO RELATED APPLICATIONS

The application claims priority of Chinese patent application CN202520950082X, filed on May 14, 2025, which is incorporated herein by reference in its entireties.

TECHNICAL FIELD

The present invention relates to the field of feeder supplies, particularly to a bird feeder.

BACKGROUND ART

Bird feeders not only provide a convenient food source for birds but also bring multiple benefits. The benefits of the bird feeders are reflected in the following aspects. First, the bird feeders help protect wild birds. In natural environments, obtaining food is often challenging, especially during winter or seasons with scarce food. The arrangement of the bird feeders provides a stable food supply for birds, ensuring that the birds can smoothly overcome these difficult times. Second, the bird feeders promote harmonious coexistence between humans and nature. By feeding birds, people can observe and understand these beautiful creatures up close, thereby cultivating a love for and awareness of protecting the natural environment. Meanwhile, birds will also become closer to humans, forming a warm interactive relationship. Additionally, the bird feeders also contribute to the improvement of the ecological environment. The presence of birds is crucial for ecosystem balance, as they play important roles in seed dispersal, pest control, and other aspects. By feeding birds, we are actually contributing to the improvement of the ecological environment. However, existing bird feeders on the market have only a single feeding function and cannot record the feeding process in a timely manner.

SUMMARY

In order to overcome the shortcomings of the prior art, the present invention provides a bird feeder. The bird feeder includes:

a main body, wherein the main body is provided with a feed bin and a feed dispensing opening, and the feed bin is in communication with the feed dispensing opening;

a camera, wherein the camera is connected to the main body;

a rechargeable battery, wherein the battery is electrically connected to the camera; and a solar power supply device, wherein the solar power supply device is electrically connected to the battery; the solar power supply device includes a solar panel, the solar panel is connected to the main body, and the solar panel covers at least one part of a surface of the main body.

Beneficial effects of the present invention are as follows. The present invention provides the bird feeder. The bird feeder includes the main body, the camera, the rechargeable battery, and the solar power supply device. The main body is provided with the feed bin and the feed dispensing opening, and the feed bin is in communication with the feed dispensing opening. The camera is connected to the main body. The battery is electrically connected to the camera. The solar power supply device is electrically connected to the battery. The solar power supply device includes the solar panel, the solar panel is connected to the main body, and the solar panel covers at least one part of the surface of the main body. Therefore, the camera can capture and record a feeding process of the bird feeder and changes in an environment around the bird feeder in a timely manner. Moreover, the battery can be charged through the solar power supply device, so that the battery supplies power to the camera. This enhances the battery life of the camera, allowing the camera to shoot for a long time. Moreover, since the solar panel is connected to the main body and covers at least one part of the surface of the main body, the solar panel is combined with the main body to form a whole. The solar panel covering one part of the surface of the main body can receive sunlight well, which facilitates the installation of the solar panel and the main body. Only an installation position of the main body needs to be found, and there is no need to find an additional installation position to install the solar panel. The structure is compact, and the installation speed and efficiency of the bird feeder are greatly improved.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
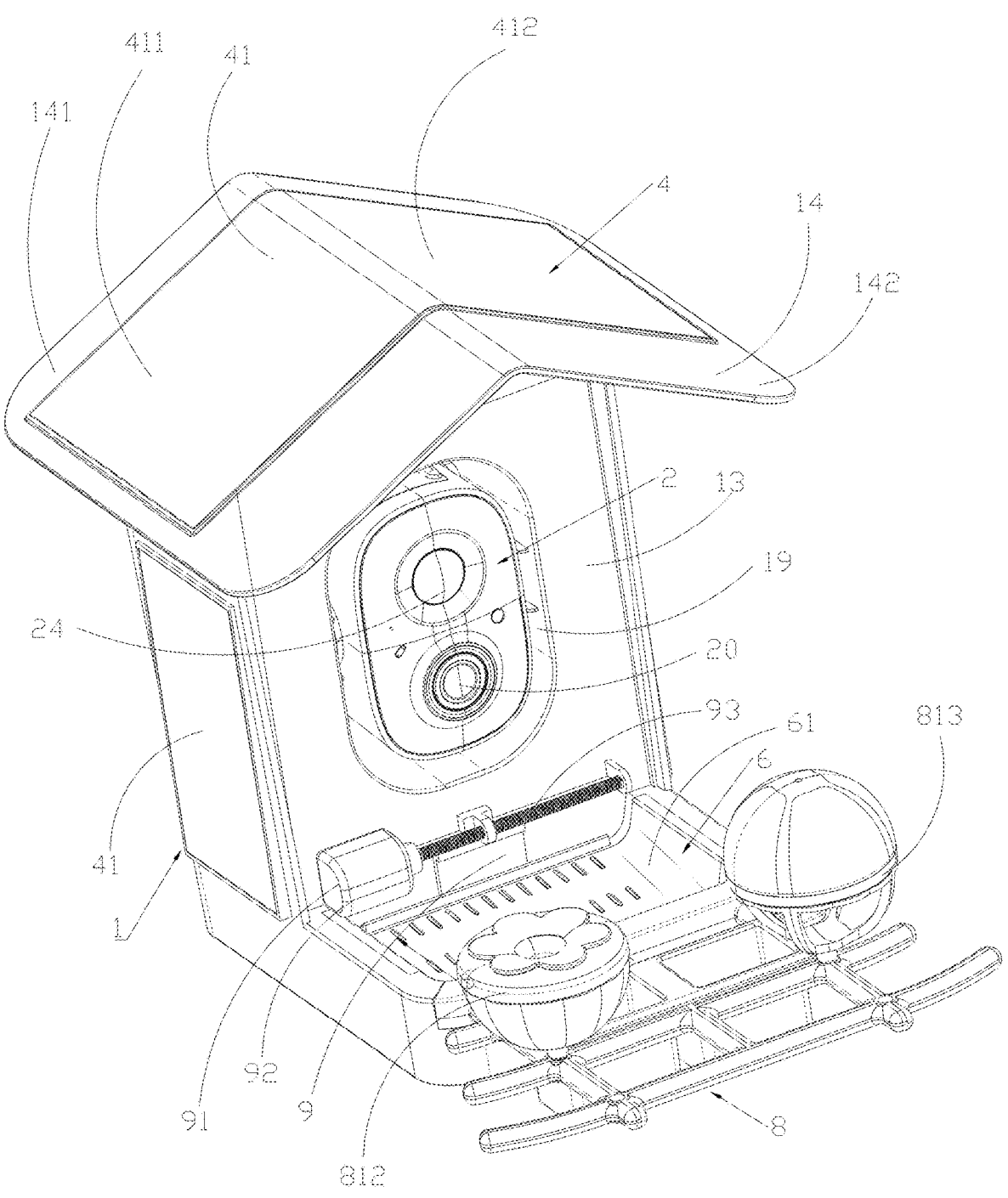
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
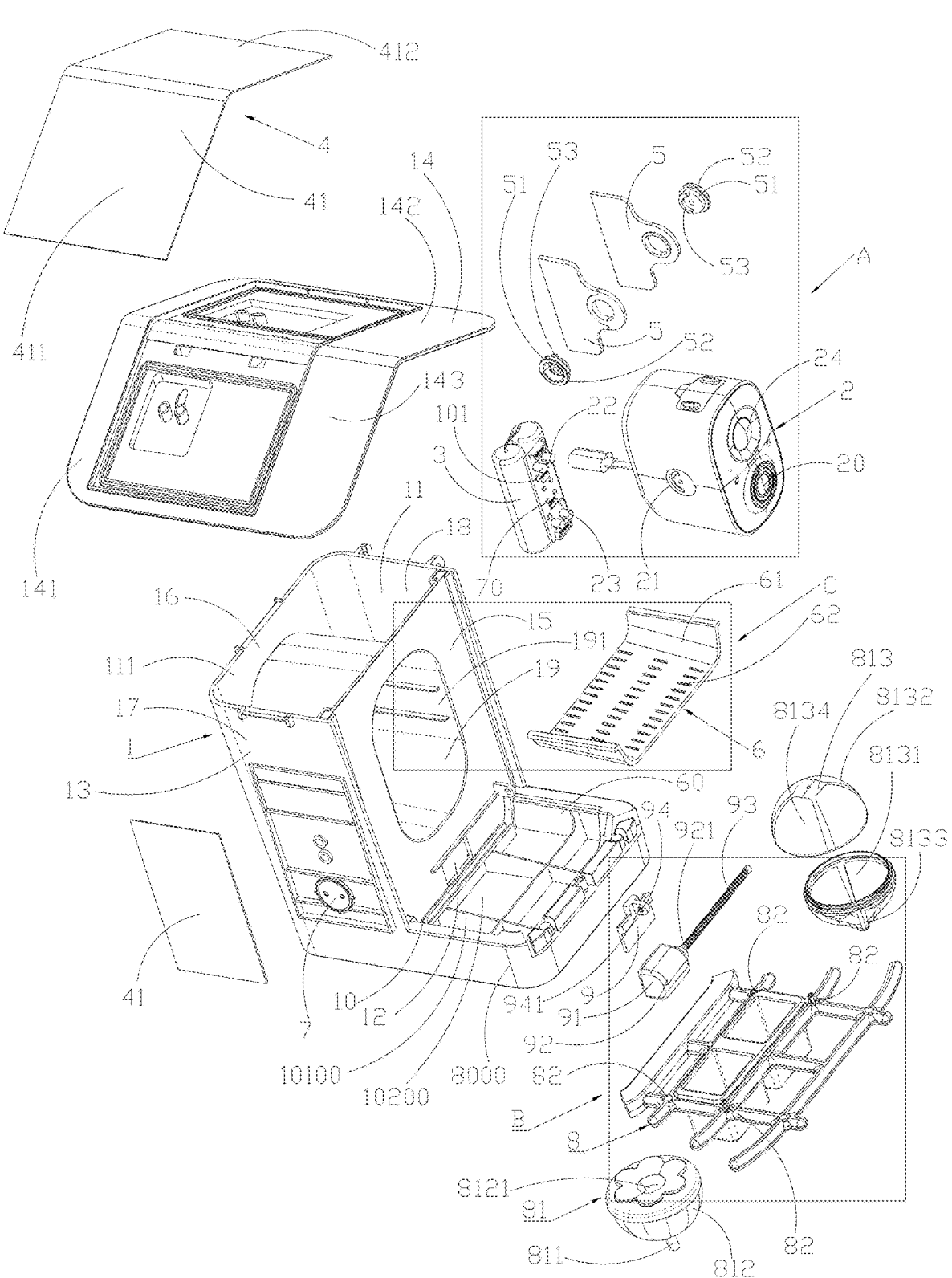
FIG. 2 is an exploded view of the present invention.
Figure 3:
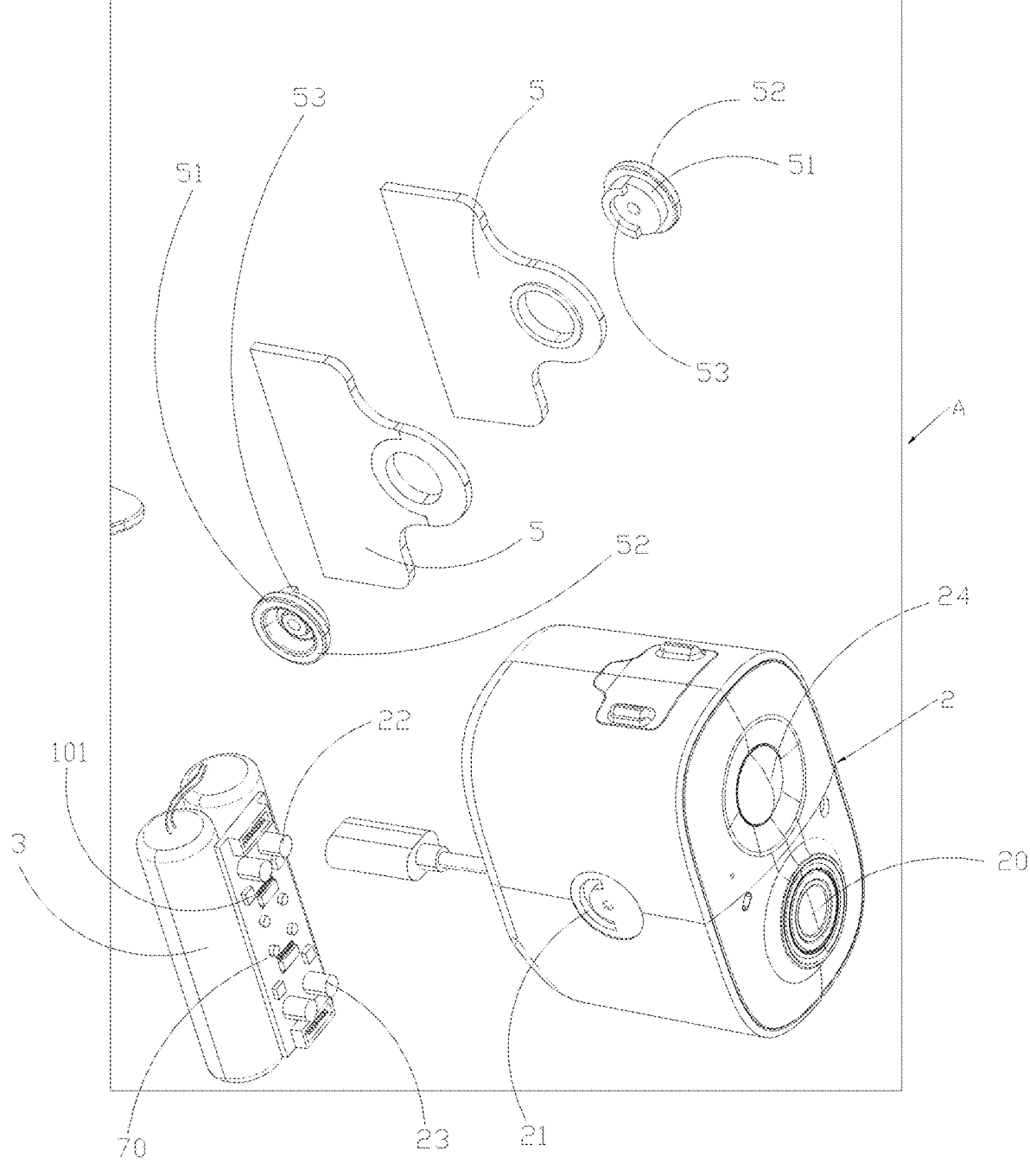
FIG. 3 is an enlarged view of area A in FIG. 2.
Figure 4:
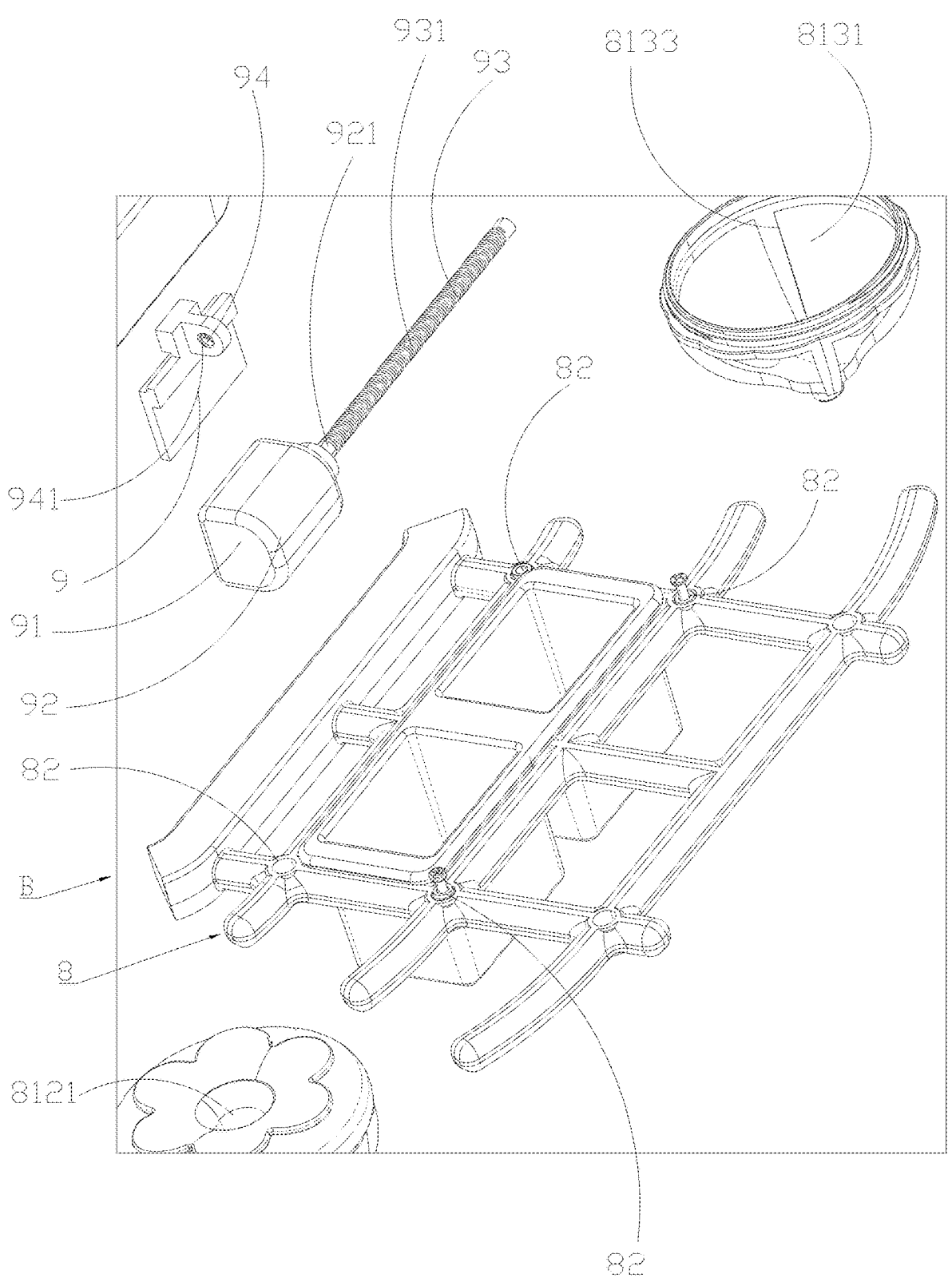
FIG. 4 is an enlarged view of area B in FIG. 2.
Figure 5:
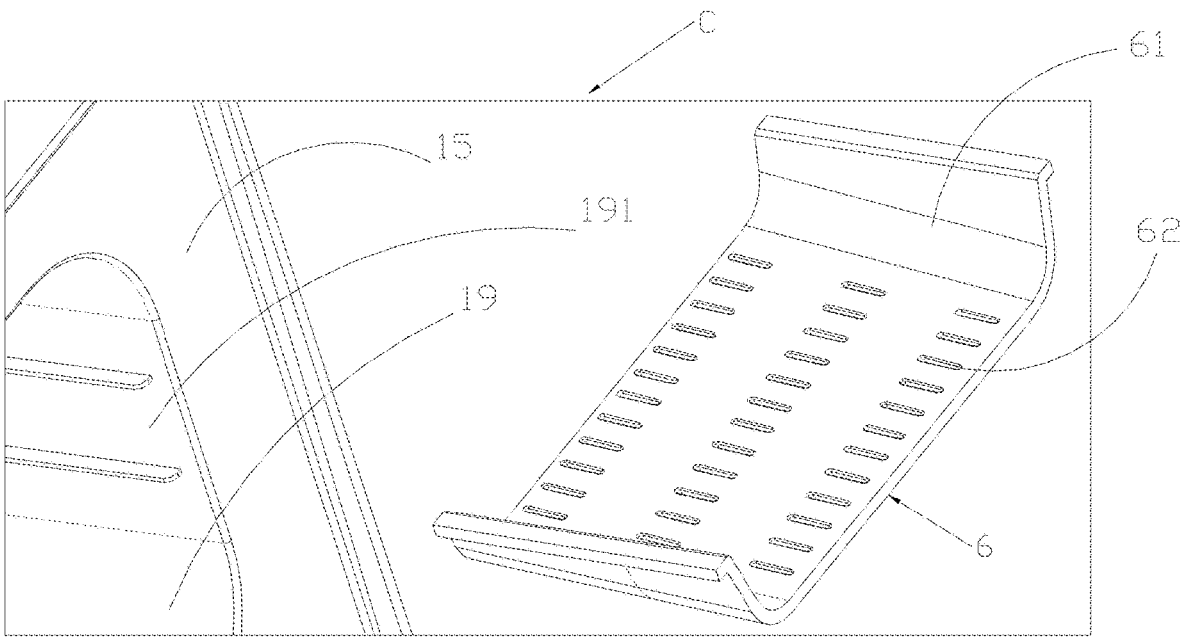
FIG. 5 is an enlarged view of area C in FIG. 2.
Figure 6:
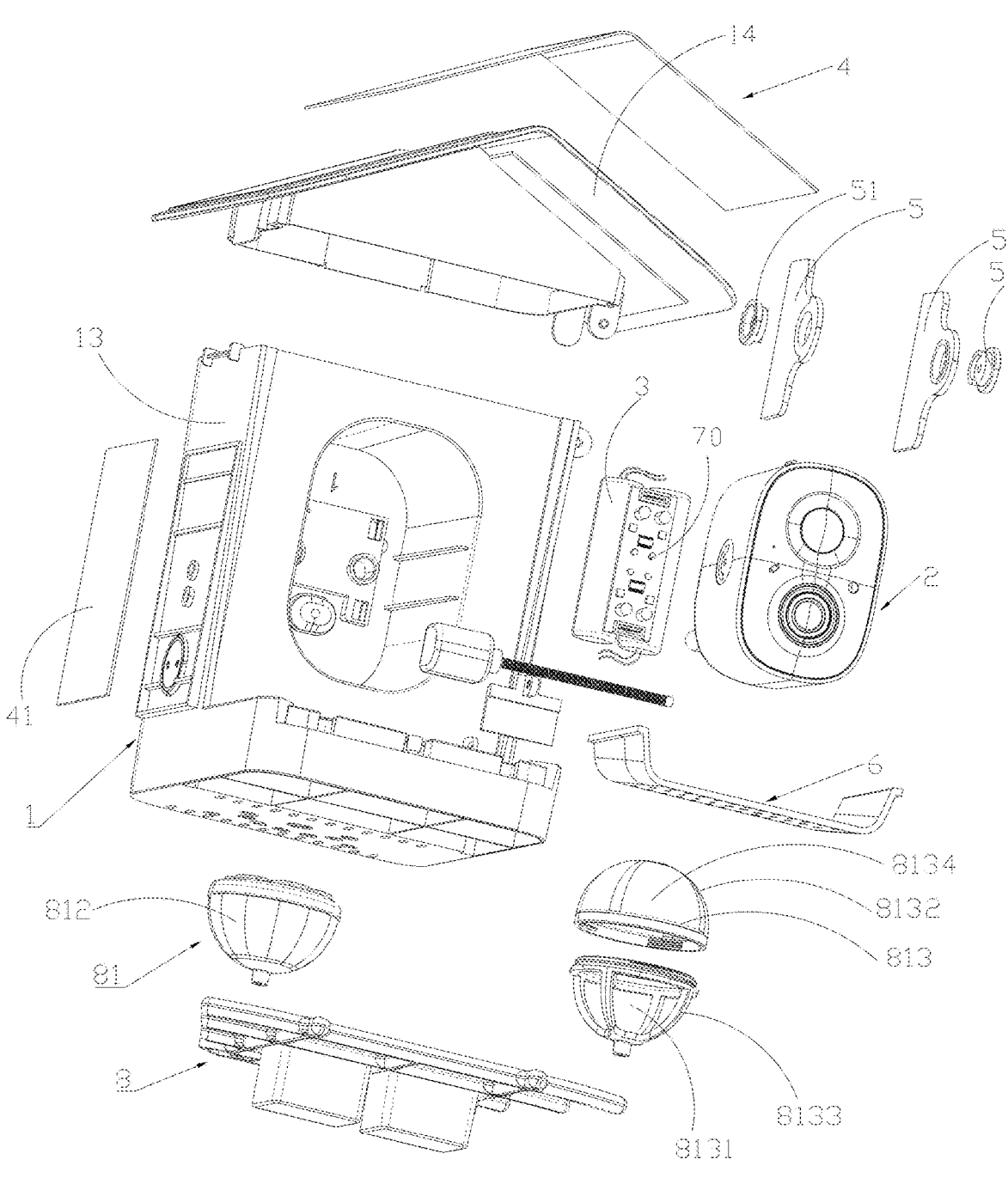
FIG. 6 is another exploded view of the present invention.
Figure 7:
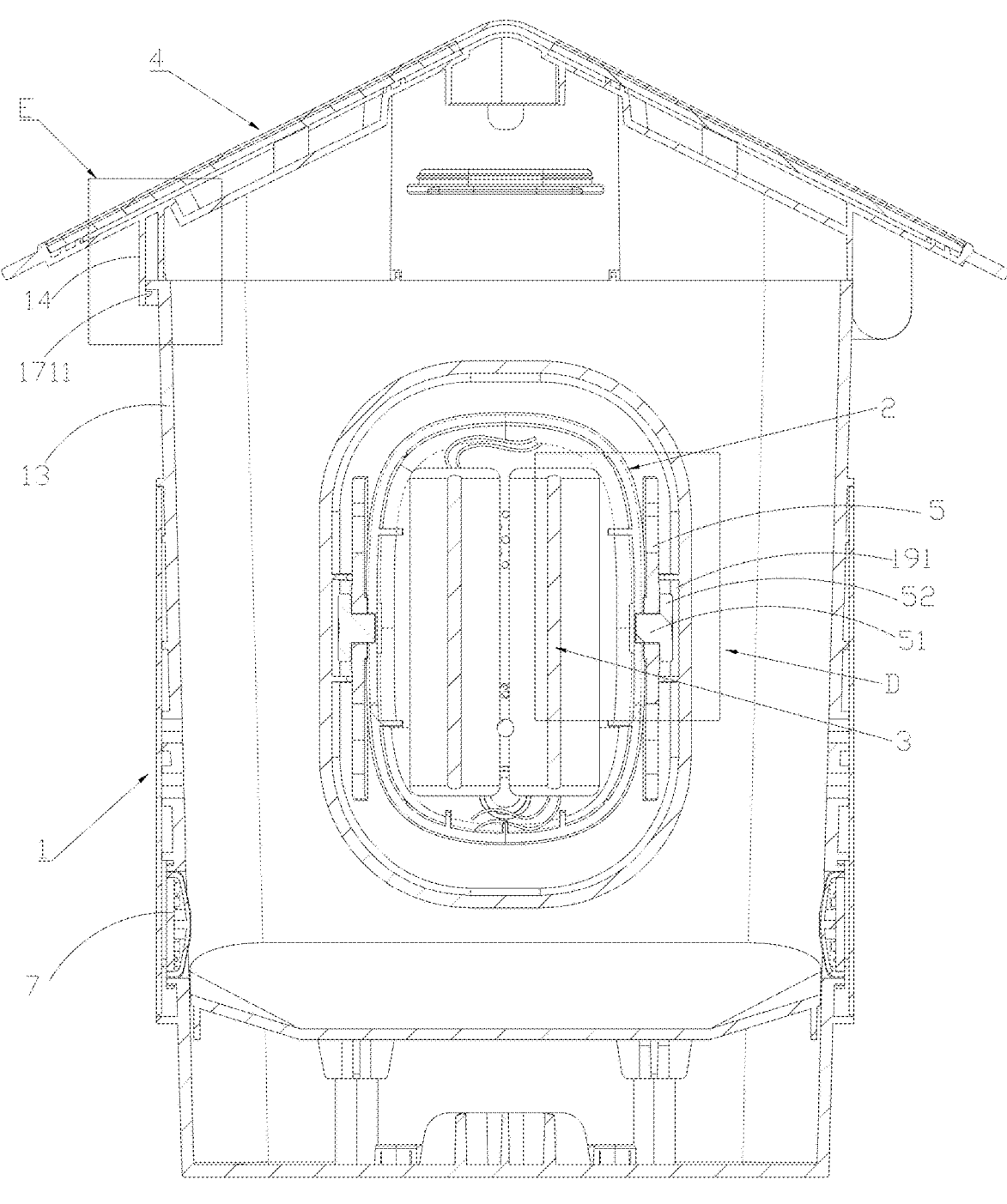
FIG. 7 is a cross-sectional view taken along a top cover and a base.
Figure 8:
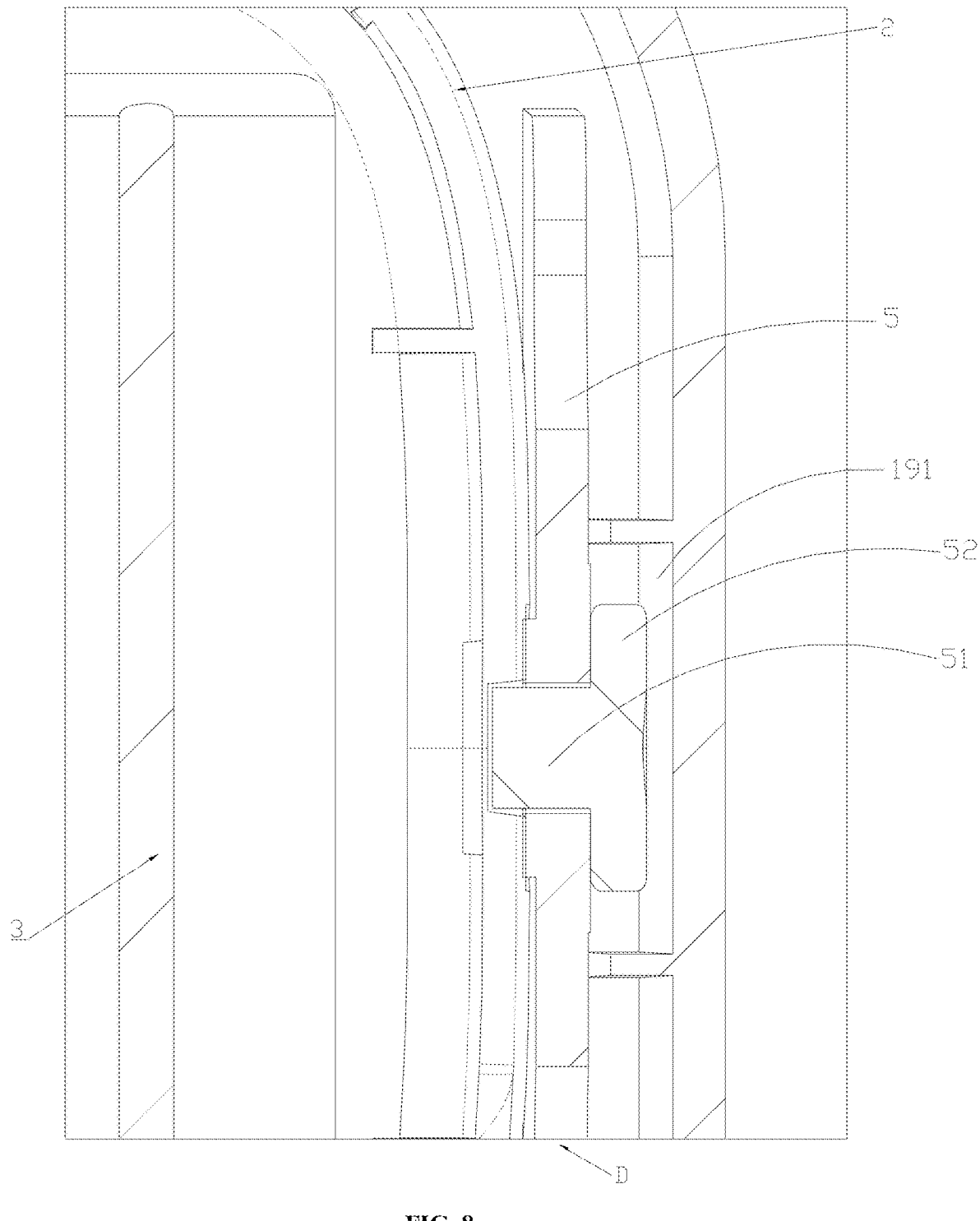
FIG. 8 is an enlarged view of area D in FIG. 7.
Figure 9:
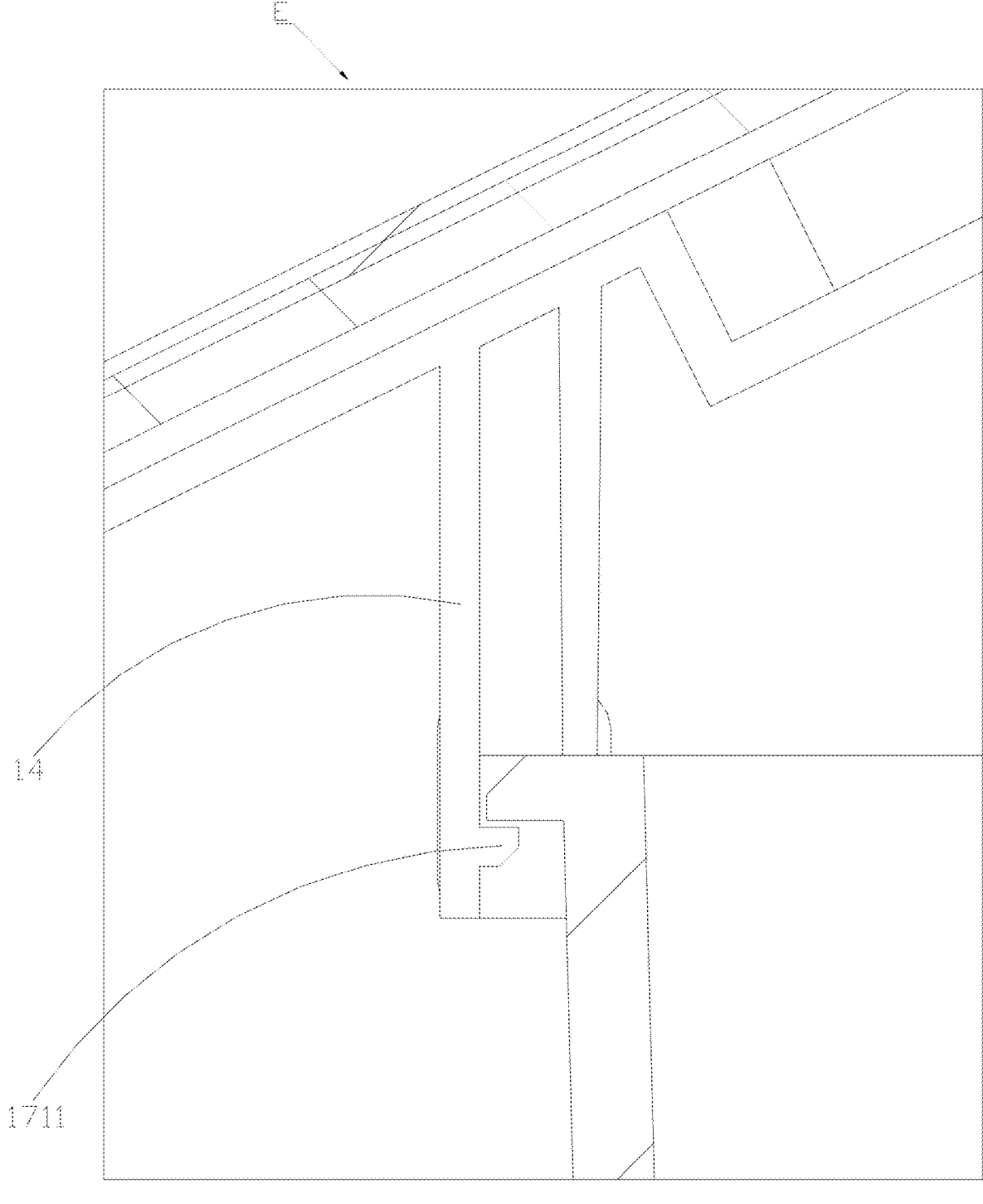
FIG. 9 is an enlarged view of area E in FIG. 7.
Figure 10:
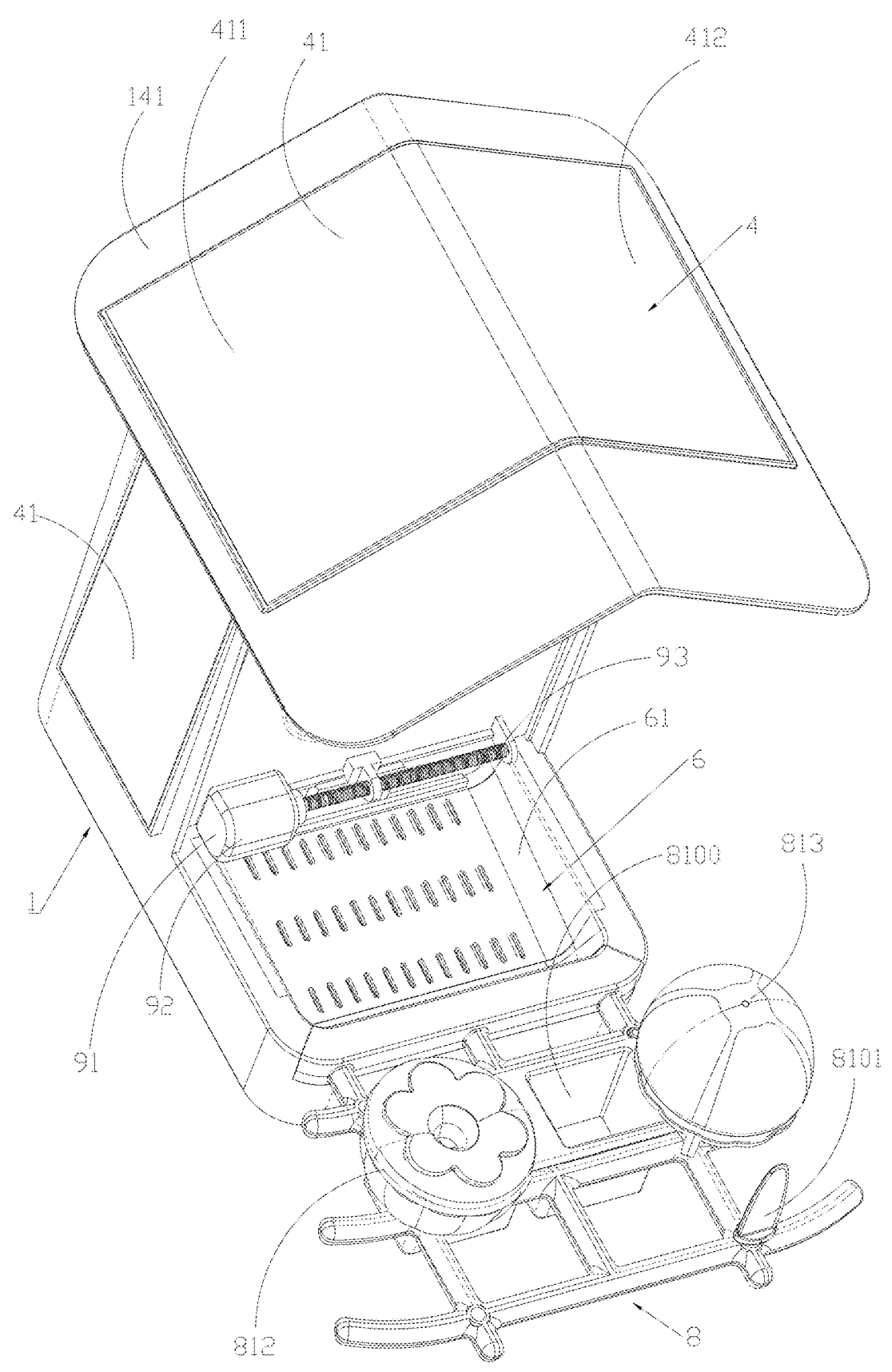
FIG. 10 is another schematic diagram of an overall structure of the present invention.

Referring to FIGS. 1-10, a bird feeder includes:

a main body 1, wherein the main body 1 is provided with a feed bin 11 and a feed dispensing opening 12, and the feed bin 11 is in communication with the feed dispensing opening 12;

a camera 2, wherein the camera 2 is connected to the main body 1;

a rechargeable battery 3, wherein the battery 3 is electrically connected to the camera 2; and a solar power supply device 4, wherein the solar power supply device 4 is electrically connected to the battery 3; the solar power supply device 4 includes a solar panel 41, the solar panel 41 is connected to the main body 1, and the solar panel 41 covers at least one part of a surface of the main body 1.

Through the above structure, the bird feeder includes the main body 1, the camera 2, the rechargeable battery 3, and the solar power supply device 4. The main body 1 is provided with the feed bin 11 and the feed dispensing opening 12, and the feed bin 11 is in communication with the feed dispensing opening 12. The camera 2 is connected to the main body 1. The battery 3 is electrically connected to the camera 2. The solar power supply device 4 is electrically connected to the battery 3. The solar power supply device 4 includes the solar panel 41, the solar panel 41 is connected to the main body 1, and the solar panel 41 covers at least one part of the surface of the main body 1. Therefore, the camera 2 can capture and record a feeding process of the bird feeder and changes in an environment around the bird feeder in a timely manner. Moreover, the battery 3 can be charged through the solar power supply device 4, so that the battery 3 supplies power to the camera 2. This enhances the battery life of the camera 2, allowing the camera 2 to shoot for a long time. Moreover, since the solar panel 41 is connected to the main body 1 and covers at least one part of the surface of the main body 1, the solar panel 41 is combined with the main body 1 to form a whole. In addition, the solar panel 41 covering one part of the surface of the main body 1 can receive sunlight well, which facilitates the installation of the solar panel 41 and the main body 1. Only an installation position of the main body 1 needs to be found, and there is no need to find an additional installation position to install the solar panel 41. The structure is compact, and the installation speed and efficiency of the bird feeder are greatly improved.

In this embodiment, the solar panel 41 includes a first solar panel unit 411 and a second solar panel unit 412. The first solar panel unit 411 covers at least one part of the surface of the main body 1, and the second solar panel unit 412 covers at least another part of the surface of the main body 1. Through the above structure, since the first solar panel unit 411 covers at least one part of the surface of the main body 1, and the second solar panel unit 412 covers at least another part of the surface of the main body 1, it is convenient for the first solar panel unit 411 and the second solar panel unit 412 to receive sunlight from different positions of the bird feeder, greatly improving a light energy conversion efficiency of the solar power supply device 4, and enhancing a charging efficiency of the solar power supply device 4 to the battery 3.

In this embodiment, the first solar panel unit 411 and the second solar panel unit 412 are separately arranged. Alternatively, the first solar panel unit 411 and the second solar panel unit 412 are integrally formed. Through the above structure, the arrangement of the first solar panel unit 411 and the second solar panel unit 412 is effectively achieved. The first solar panel unit 411 and the second solar panel unit 412 which are separated can be easily connected to various positions of the main body 1. The first solar panel unit 411 and the second solar panel unit 412 which are integrated have better overall integrity, facilitating the installation and production.

In this embodiment, the main body 1 includes a base 13 and a top cover 14. The feed bin 11 is positioned on the base 13. The top cover 14 is connected to the base 13. The solar panel is connected to the top cover 14, and the solar panel 41 covers at least one part of a surface of the top cover 14. With the above structure, by arranging the solar panel 41 on the top cover 14 of the main body 1, the solar panel 41 can receive sunlight more efficiently.

In this embodiment, the top cover 14 and the base 13 are arranged at an inclined angle. The top cover 14 includes a left half part 141 and a right half part 142. The left half part 141 is connected to the right half part 142, and the left half part 141 and the right half part 142 are arranged at an inclined angle. The first solar panel unit 411 is connected to the left half part 141, and the second solar panel unit 412 is connected to the right half part 142. The first solar panel unit 411 covers at least one part of a surface of the left half part 141, and the second solar panel unit 412 covers at least one part of a surface of the right half part 142. Through the above structure, the left half part 141 and the right half part 142 are arranged at an inclined angle, the first solar panel unit 411 is connected to the left half part 141, the second solar panel unit 412 is connected to the right half part 142, the first solar panel unit 411 covers at least one part of the surface of the left half part 141, and the second solar panel unit 412 covers at least one part of the surface of the right half part 142, so that the first solar panel unit 411 and the second solar panel unit are arranged in different directions, allowing the first solar panel unit 411 and the second solar panel unit 412 to receive sunlight from different angles, thereby improving the charging efficiency of the solar power supply device 4 to the battery 3.

In this embodiment, the main body 1 includes a base 13 and a top cover 14. The feed bin 11 is positioned on the base 13, and the top cover 14 is connected to the base 13. An upper side of the base 13 is provided with a feed bin opening 111 in communication with the feed bin 11. The feed dispensing opening 12 is positioned in a lower side of the base 13. A first end of the top cover 14 is rotatably connected to the base 13, and a second end of the top cover 14 is detachably connected to the base 13, so that the top cover 14 is rotatable between an open position and a closed position. When the top cover 14 is in the closed position, the top cover 14 covers the feed bin opening 111. When the top cover 14 is in the open position, the top cover 14 opens the feed bin opening 111. The main body 1 is provided with a front side wall 15, a rear side wall 16, a left side wall 17, and a right side wall 18. The front side wall 15 and/or the rear side wall 16 are transparent side walls. The first end of the top cover 14 is rotatably connected to the right side wall 18, and the second end of the top cover 14 is detachably connected to the left side wall 17. Through the above structure, the connection between the top cover 14 and the base 13 is effectively achieved, and it is convenient to open the top cover 14 to replenish feed into the feed bin 11. Furthermore, since the front side wall 15 and/or the rear side wall 16 are transparent side walls, the user can easily observe a remaining amount of the feed in the feed bin 11, so that the user can add feed to the feed bin 11 in a timely manner. The second end of the top cover 14 is detachably connected to the left side wall 17 through a buckle 1711.

In this embodiment, an installation cavity 19 is defined in the main body 1. The camera 2 is rotatably connected to the main body 1. The camera 2 is positioned inside the installation cavity 19. The camera 2 is rotatable inside the installation cavity 19. The installation cavity 19 is formed by recessing an outer surface of the feed bin 11. The bird feeder further includes an installation bracket 5. The installation bracket 5 is arranged in the installation cavity 19. The installation bracket 5 is connected to the camera. The bird feeder further includes a first locking member 51. The installation bracket 5 is connected to the camera through the first locking member 51. An inner wall of the installation cavity 19 is formed with a first rotating slot 191. The installation bracket 5 is provided with a protruding rotating shaft 52. The rotating shaft 52 is rotatable within the first rotating slot 191. The installation bracket 5 is provided with an arc-shaped positioning convex block 53. A side wall of the camera 2 is provided with an arc-shaped positioning groove 21. The positioning convex block 53 is connected to the positioning groove 21. Through the above structure, the connection is stable, the installation of the camera 2 is effectively achieved, and the camera 2 can shoot from different angles by rotating.

In this embodiment, the bird feeder further includes a tray 6. The tray 6 is detachably connected to the main body 1, and the tray 6 is positioned below the feed dispensing opening 12. Through the above structure, due to the detachable connection between the tray 6 and the main body 1, the user can easily disassemble, replace, and clean the tray 6. A tray installation slot 60 is defined in the main body. The tray 6 is detachably installed in the tray installation slot 60.

In this embodiment, the tray 6 is provided with a feeding trough 61. A bottom surface of the feeding trough 61 is arranged at an inclined angle. A depth of the feeding trough 61 gradually increases from a first side of the tray 6 to a second side of the tray 6. Through the above structure, since the bottom surface of the feeding trough 61 is arranged at an inclined angle, the flow of feed is facilitated, allowing the feed flowing out from the feed dispensing opening 12 to flow along the inclined bottom surface to various positions of the tray 6, and preventing the feed from blocking a feed opening.

In this embodiment, the tray 6 is provided with a feeding trough 61. The tray 6 is also provided with a plurality of drainage holes 62. The drainage holes 62 are in communication with the feeding trough 61. Through the above structure, since the tray 6 is also provided with the plurality of drainage holes 62, water accumulation can be prevented inside the tray 6, thereby preventing mold growth of the feed inside the tray 6.

In this embodiment, the main body 1 includes a base 13 and a top cover 14. The feed bin 11 is positioned on the base

13, and the top cover 14 is connected to the base 13. The top cover 14 extends to form an eave part 143. The tray 6 is provided with a feeding trough 61. The eave part 143 is positioned above the feeding trough 61. Through the above structure, since the eave part 143 is positioned above the feeding trough 61, the feed in the feeding trough 61 can be prevented from being wet by rain, and the feed in the feeding trough 61 can also be prevented from being exposed to the sun.

In this embodiment, a first boost module 22 is provided between the battery 3 and the camera 2. The first boost module 22 is used for boosting an output voltage of the battery 3 and outputting the output voltage to the camera 2. Through the above structure, the first boost module 22 is used for boosting the output voltage of the battery 3 and outputting the output voltage to the camera 2, so that the battery 3 is capable of driving the camera 2 to work. In addition, the first boost module is capable of extending the usage time of the battery 3 and improving the performance of the camera 2. Moreover, the first boost module is also capable of reducing energy loss and protecting the battery 3 and the camera 2. Through an efficient voltage conversion function of the first boost module, the stable operation of the camera 2 under various conditions of the battery 3 is ensured.

In this embodiment, a second boost module 23 is provided between the solar power supply device 4 and the battery 3. The second boost module 23 is used for boosting an output voltage of the solar power supply device 4 and outputting the output voltage to the battery 3. Through the above structure, the second boosting module 23 is used for boosting the output voltage of the solar power supply device 4 and outputting the output voltage to the battery 3, and the second boosting module is capable of converting a low voltage generated by the solar panel 41 into a higher voltage suitable for storage or use by the battery 3.

In this embodiment, a feed shortage detection device 7 and a control motherboard 70 are arranged inside the feed bin 11. The feed shortage detection device 7 is electrically connected to the control motherboard. The feed shortage detection device 7 is used for detecting whether a feed level in the feed bin 11 is lower than a preset level. The feed shortage detection device 7 is an infrared feed shortage detection device 7. Through the above structure, the feed shortage detection device 7 is capable of detecting whether the feed level in the feed bin is lower than the preset level. If the feed level is lower than the preset level, an alarm will alert the user to replenish feed into the feed bin 11 in a timely manner. The alarm can be triggered by visual (light) or audible (sound) alerts, and can also be transmitted wirelessly to an application on a mobile phone. The bird feeder further includes a wireless communication module 101. The feed shortage detection device 7 is electrically connected to the wireless communication module 101 and the control motherboard. When the feed level is below the preset level, the wireless communication module 101 sends an alarm signal to the application on the mobile phone to remotely remind customers.

In this embodiment, the bird feeder further includes a motion sensing module 24 and a control motherboard 70. The motion sensing module 24 is used for detecting whether an animal passes within a detection range. The motion sensing module 24 is electrically connected to the camera 2 and the control motherboard. The camera is provided with a camera lens 20. When the motion sensing module 24 detects an animal passing within the detection range, the camera lens 20 of the camera 2 is turned on. When the motion sensing module 24 does not detect any animal passing within the detection range, the camera lens 20 of the camera 2 is turned off. The motion sensing module 24 is an infrared motion sensing module 24. Only when the motion sensing module 24 detects an animal passing within the detection range, will the camera lens 20 of the camera 2 be turned on, which can greatly reduce the power consumption of the camera 2 and save the storage space of the camera 2.

In this embodiment, the battery 3 is detachably or fixedly connected to the main body 1 or the camera 2. Through the above structure, the design is reasonable, the structure is compact, and the installation of the battery 3 is effectively achieved.

In this embodiment, the main body further includes a bird perch 8, a bottom support 8000, and a feeding device 81. The bird feeder further includes a tray. The base of the main body is provided with a tray installation slot. The tray is detachably installed in the tray installation slot. The bird perch 8 is connected to the base. The feeding device 81 is detachably connected to the bird perch 8. The feeding device 81 includes an insertion column 811. A plurality of insertion openings 82 are defined in the bird perch 8. The insertion column 811 is detachably connected to one of the plurality of the insertion openings 82. The feeding device 81 includes a honey pot 812 and a food clamping cage 813. The honey pot 812 is provided with an accommodating slot 8121 for accommodating liquid. A side wall of the food clamping cage 813 surrounds to form a clamping cavity 8131 for clamping food. The food clamping cage 813 includes an upper half part 8132 and a lower half part 8133. The upper half part 8132 is detachably connected to the lower half part 8133, and the upper half part 8132 and the lower half part 8133 surround to form the clamping cavity 8131. A plurality of feeding openings 8134 are defined in the side wall surrounding the food clamping cage 813. The plurality of feeding openings 8134 are in communication with the clamping cavity 8131. The feeding device 81 also includes a water trough 8100 and a fruit fork 8101. The water trough is used for holding liquid, and the fruit fork is used for forking fruits. Through the above structure, the insertion column 811 is detachably connected to one of the plurality of insertion openings 82, so that the user can choose an installation position for the feeding device 81 according to an actual need. Furthermore, the upper half part 8132 and the lower half part 8133 surround to form the clamping cavity 8131, making it convenient for the user to clamp fruits inside the clamping cavity 8131. Moreover, the plurality of feeding openings 8134, defined in the side wall surrounding the food clamping cage 813, can facilitate the birds to eat the food inside the food clamping cage 813. The clamping cavity is used for the placement of pine resin balls or other large food for birds to eat. The design of this food clamping cage can effectively prevent birds from taking food away from an observation area, so as not to affect the observation. Furthermore, the fruit fork is capable of forking fruits, providing more installation methods for the fruits. Furthermore, the water trough is capable of holding water, and the honey pot is capable of holding honey, sugar water, or the like.

In this embodiment, the bird feeder further includes a sealing cover 9. The sealing cover 9 is connected to the main body 1. The sealing cover 9 is movable between an open position and a closed position. When the sealing cover 9 is in the closed position, the sealing cover 9 covers the feed dispensing opening 12. When the sealing cover 9 is in the open position, the sealing cover 9 opens the feed dispensing opening 12. The bird feeder further includes a driving device 91. The driving device 91 is electrically connected to the battery 3. The driving device 91 is connected to the sealing cover 9. The driving device 91 is used for driving the sealing cover 9 to move between the open position and the closed position. When the camera 2 detects a bird within a detection range, the driving device 91 drives the sealing cover 9 to move to the open position. When the camera 2 does not detect any bird within the detection range, the driving device 91 drives the sealing cover 9 to move to the closed position. The driving device 91 includes a driving motor 92 and a threaded rod 93. The driving motor 92 is provided with an output shaft 921. The threaded rod 93 is sleeved on the output shaft 921. The sealing cover 9 is provided with a penetrating opening 94. The threaded rod 93 is provided with an external thread 931. The penetrating opening 94 is provided with an internal thread 941. The external thread 931 is connected to the internal thread 941. The output shaft 921 rotates to drive the threaded rod 93 to rotate, and the threaded rod 93 rotates to drive the sealing cover 9 to move between the closed position and the open position. The main body 1 is also equipped with a sliding slot 10. The penetrating opening 94 is defined in an upper side of the sealing cover 9. A lower side of the sealing cover 9 is slidable inside the sliding slot 10. Through the above structure, when the camera 2 detects a bird within the detection range, the driving device 91 drives the sealing cover 9 to move to the open position. When the camera 2 does not detect any bird within the detection range, the driving device 91 drives the sealing cover 9 to move to the closed position, so that the bird feeder only feeds birds and does not feed other animals except birds, making feeding more accurate. When the camera 2 is shooting, the image content captured by the camera 2 is compared with the bird images stored in a database. When the image content matches successfully with the bird images stored in the database, it is determined that birds are detected within the detection range. Specifically, the tray installation slot is internally equipped with a plurality of transversely and longitudinally crisscrossing reinforcing ribs 10100. The plurality of reinforcing ribs 10100 divide the tray installation slot into a plurality of anti-overflow slots 10200. The anti-overflow slots 10200 are capable of accommodating the liquid flowing out of the drainage holes of the tray.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A bird feeder, comprising:
a main body, wherein the main body is provided with a feed bin and a feed dispensing opening, and the feed bin is in communication with the feed dispensing opening;
a camera, wherein the camera is connected to the main body;
a rechargeable battery, wherein the battery is electrically connected to the camera; and
a solar power supply device, wherein the solar power supply device is electrically connected to the battery; the solar power supply device comprises a solar panel, and the solar panel is connected to the main body;
wherein the main body further comprises a bird perch, a bottom support, and a feeding device; the bird feeder further comprises a tray; the base of the main body is provided with a tray installation slot; the tray is detachably installed in the tray installation slot; the bird perch is connected to the base; and the feeding device is detachably connected to the bird perch;

wherein the feeding device comprises an insertion column; a plurality of insertion openings are defined in the bird perch; the insertion column is detachably connected to one of the plurality of the insertion openings; the feeding device comprises a honey pot and a food clamping cage; the honey pot is provided with an accommodating slot for accommodating liquid; a side wall of the food clamping cage surrounds to form a clamping cavity for clamping food; the food clamping cage comprises an upper half part and a lower half part; the upper half part is detachably connected to the lower half part; the upper half part and the lower half part surround to form the clamping cavity; a plurality of feeding openings are defined in the side wall surrounding the food clamping cage; the plurality of feeding openings are in communication with the clamping cavity; the feeding device also comprises a water trough and a fruit fork; the water trough is used for holding liquid; and the fruit fork is used for forking fruits.

2. The bird feeder according to claim 1, wherein the solar panel comprises a first solar panel unit and a second solar panel unit; the first solar panel unit covers the surface of the main body, and the second solar panel unit covers the surface of the main body.

3. The bird feeder according to claim 2, wherein the first solar panel unit and the second solar panel unit are separately arranged; alternatively, the first solar panel unit and the second solar panel unit are integrally formed.

4. The bird feeder according to claim 2, wherein the main body comprises a base and a top cover; the feed bin is positioned on the base; the top cover is connected to the base; the solar panel is connected to the top cover.

5. The bird feeder according to claim 4, wherein the top cover and the base are arranged at an inclined angle; the top cover comprises a left half part and a right half part; the left half part is connected to the right half part; the left half part and the right half part are arranged at an inclined angle; the first solar panel unit is connected to the left half part; the second solar panel unit is connected to the right half part.

6. The bird feeder according to claim 1, wherein the main body comprises a base and a top cover; the feed bin is positioned on the base; the top cover is connected to the base; an upper side of the base is provided with a feed bin opening in communication with the feed bin; the feed dispensing opening is positioned in a lower side of the base; a first end of the top cover is rotatably connected to the base; a second end of the top cover is detachably connected to the base, so that the top cover is rotatable between an open position and a closed position; when the top cover is in the closed position, the top cover covers the feed bin opening; when the top cover is in the open position, the top cover opens the feed bin opening; the main body is provided with a front side wall, a rear side wall, a left side wall, and a right side wall; the front side wall and/or the rear side wall are transparent side walls; the first end of the top cover is rotatably connected to the right side wall; and the second end of the top cover is detachably connected to the left side wall.

7. The bird feeder according to claim 1, wherein an installation cavity is defined in the main body; the camera is rotatably connected to the main body; the camera is positioned inside the installation cavity; the camera is rotatable inside the installation cavity; and the installation cavity is formed by recessing an outer surface of the feed bin.

8. The bird feeder according to claim 7, further comprising an installation bracket, wherein the installation bracket is arranged in the installation cavity; the installation bracket is connected to the camera; the bird feeder further comprises a first locking member; the installation bracket is connected to the camera through the first locking member; an inner wall of the installation cavity is formed with a first rotating slot; the installation bracket is provided with a protruding rotating shaft; the protruding rotating shaft is rotatable within the first rotating slot; the installation bracket is provided with an arc-shaped positioning convex block; a side wall of the camera is provided with an arc-shaped positioning groove; and the positioning convex block is connected to the positioning groove.

9. The bird feeder according to claim 1, further comprising a tray, wherein the tray is detachably connected to the main body; and the tray is positioned below the feed dispensing opening.

10. The bird feeder according to claim 9, wherein the tray is provided with a feeding trough; a bottom surface of the feeding trough is arranged at an inclined angle; and a depth of the feeding trough gradually increases from a first side of the tray to a second side of the tray.

11. The bird feeder according to claim 9, wherein the tray is provided with a feeding trough; the tray is also provided with a plurality of drainage holes; and the drainage holes are in communication with the feeding trough.

12. The bird feeder according to claim 9, wherein the main body comprises a base and a top cover; the feed bin is positioned on the base; the top cover is connected to the base; the top cover extends to form an eave part; the tray is provided with a feeding trough; and the eave part is positioned above the feeding trough.

13. The bird feeder according to claim 1, wherein a first boost module is provided between the battery and the camera; and the first boost module is used for boosting an output voltage of the battery and outputting the output voltage to the camera.

14. The bird feeder according to claim 13, wherein a second boost module is provided between the solar power supply device and the battery; and the second boost module is used for boosting an output voltage of the solar power supply device and outputting the output voltage to the battery.

15. The bird feeder according to claim 1, wherein a feed shortage detection device and a control motherboard are arranged inside the feed bin; the feed shortage detection device is electrically connected to the control motherboard; the feed shortage detection device is used for detecting whether a feed level in the feed bin is lower than a preset level; and the feed shortage detection device is an infrared feed shortage detection device.

16. The bird feeder according to claim 1, further comprising a motion sensing module and a control motherboard, wherein the motion sensing module is used for detecting whether an animal passes within a detection range; the motion sensing module is electrically connected to the camera and the control motherboard; the camera is provided with a camera lens; when the motion sensing module detects an animal passing within the detection range, the camera lens of the camera is turned on; and when the motion sensing module does not detect any animal passing within the detection range, the camera lens of the camera is turned off.

17. The bird feeder according to claim 1, wherein the battery is detachably or fixedly connected to the main body or the camera.

18. A bird feeder, comprising:

a main body, wherein the main body is provided with a feed bin and a feed dispensing opening, and the feed bin is in communication with the feed dispensing opening;

a camera, wherein the camera is connected to the main body;

a rechargeable battery, wherein the battery is electrically connected to the camera; and a solar power supply device, wherein the solar power supply device is electrically connected to the battery; the solar power supply device comprises a solar panel, and the solar panel is connected to the main body;

the bird feeder further comprising a sealing cover, wherein the sealing cover is connected to the main body; the sealing cover is movable between an open position and a closed position; when the sealing cover is in the closed position, the sealing cover covers the feed dispensing opening; when the sealing cover is in the open position, the sealing cover opens the feed dispensing opening; the bird feeder further comprises a driving device; the driving device is electrically connected to the battery; the driving device is connected to the sealing cover; the driving device is used for driving the sealing cover to move between the open position and the closed position; when the camera detects a bird within a detection range, the driving device drives the sealing cover to move to the open position; when the camera does not detect any bird within the detection range, the driving device drives the sealing cover to move to the closed position; the driving device comprises a driving motor and a threaded rod; the driving motor is provided with an output shaft; the threaded rod is sleeved on the output shaft; the sealing cover is provided with a penetrating opening; the threaded rod is provided with an external thread; the penetrating opening is provided with an internal thread; the external thread is connected to the internal thread; the output shaft rotates to drive the threaded rod to rotate; the threaded rod rotates to drive the sealing cover to move between the closed position and the open position; the main body is also equipped with a sliding slot; the penetrating opening is defined in an upper side of the sealing cover; and a lower side of the sealing cover is slidable inside the sliding slot.

19. A bird feeder, comprising:

a main body, wherein the main body is provided with a feed bin and a feed dispensing opening, and the feed bin is in communication with the feed dispensing opening;

a camera, wherein the camera is connected to the main body;

a rechargeable battery, wherein the battery is electrically connected to the camera; and a solar power supply device, wherein the solar power supply device is electrically connected to the battery; the solar power supply device comprises a solar panel, and the solar panel is connected to the main body;

wherein a first boost module is provided between the battery and the camera; and the first boost module is used for boosting an output voltage of the battery and outputting the output voltage to the camera;

wherein a second boost module is provided between the solar power supply device and the battery; and the second boost module is used for boosting an output voltage of the solar power supply device and outputting the output voltage to the battery.

20. A bird feeder, comprising:

a main body, wherein the main body is provided with a feed bin and a feed dispensing opening, and the feed bin is in communication with the feed dispensing opening;

a camera, wherein the camera is connected to the main body;

a rechargeable battery, wherein the battery is electrically connected to the camera; and a solar power supply device, wherein the solar power supply device is electrically connected to the battery; the solar power supply device comprises a solar panel, and the solar panel is connected to the main body;

the bird feeder further comprising a sealing cover, wherein the sealing cover is connected to the main body; the sealing cover is movable between an open position and a closed position; when the sealing cover is in the closed position, the sealing cover covers the feed dispensing opening; when the sealing cover is in the open position, the sealing cover opens the feed dispensing opening;

the bird feeder further comprising a driving device, wherein the driving device is electrically connected to the battery; the driving device is connected to the sealing cover; the driving device is used for driving the sealing cover to move between the open position and the closed position.

* * * * *